US007027575B1

(12) United States Patent
Burgess

(10) Patent No.: US 7,027,575 B1
(45) Date of Patent: Apr. 11, 2006

(54) METHOD AND APPARATUS FOR ASSIGNING TELEPHONE NUMBERS

(75) Inventor: Paul Norman Burgess, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 549 days.

(21) Appl. No.: 09/366,896

(22) Filed: Aug. 4, 1999

(51) Int. Cl.
*H04Q 7/38* (2006.01)

(52) U.S. Cl. .................... 379/201.01; 455/406

(58) Field of Classification Search ........... 379/127.01, 379/111–134, 201.01, 211.01, 211.02, 212.01; 455/408, 406, 404, 419
See application file for complete search history.

(56) References Cited

U.S. PATENT DOCUMENTS

| | | | | |
|---|---|---|---|---|
| 4,734,928 A | * | 3/1988 | Weiner et al. ............... 379/59 |
| 5,465,388 A | * | 11/1995 | Zicker ...................... 455/33.1 |
| 5,657,373 A | * | 8/1997 | Hermansson et al. ....... 455/435 |
| 5,722,067 A | * | 2/1998 | Fougnies et al. ........... 455/406 |
| 5,729,598 A | * | 3/1998 | Kay ........................... 379/115 |
| 5,966,654 A | * | 10/1999 | Croughwell et al. ........ 455/414 |
| 6,085,081 A | * | 7/2000 | Leskinen .................... 455/406 |
| 6,130,935 A | * | 10/2000 | Shaffer et al. .............. 379/127 |
| 6,163,606 A | * | 12/2000 | Otto ........................... 379/211 |
| 6,272,214 B1 | * | 8/2001 | Jonsson ...................... 379/202 |
| 6,327,353 B1 | * | 12/2001 | Fukuzawa et al. ..... 379/201.01 |
| 6,393,117 B1 | * | 5/2002 | Trell ..................... 379/207.01 |

* cited by examiner

*Primary Examiner*—William J. Deane, Jr.

(57) ABSTRACT

Telephone numbers are omitted from a communications device (200) or line (110*b*), thereby inhibiting incoming calls. Outgoing calls are permitted on the line or communications device and are facilitated in part by an equipment identifier (122*b*, 222) used in a telecommunications network. A surrogate telephone number, which may already be assigned to a customer, is used for billing, caller identification and other functions. The equipment identifier is used for maintenance, administration and other functions associated with the communications device or line. A telephone number is temporarily made available to the communications device or line for a predetermined period of time upon request by a user. This advantageously reduces the number of telephone numbers required in a telecommunications network.

20 Claims, 3 Drawing Sheets

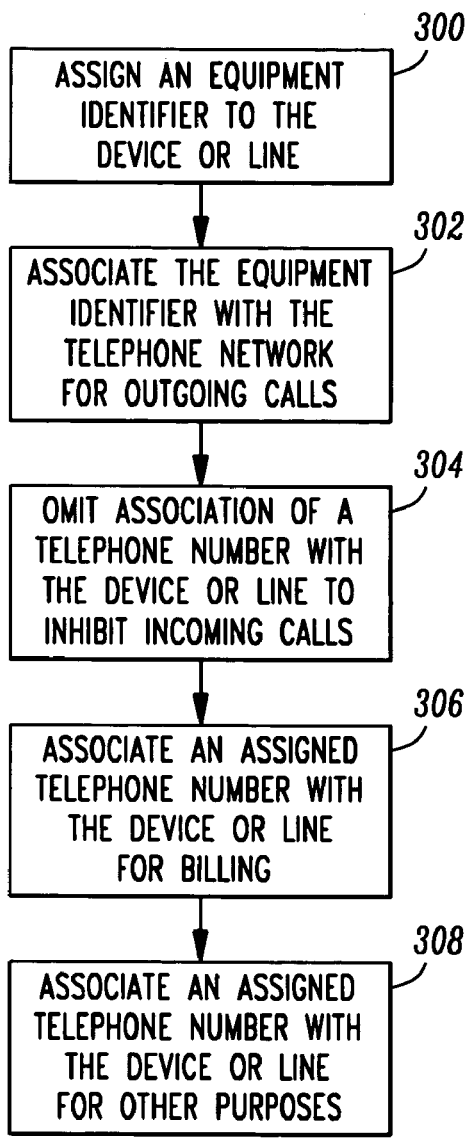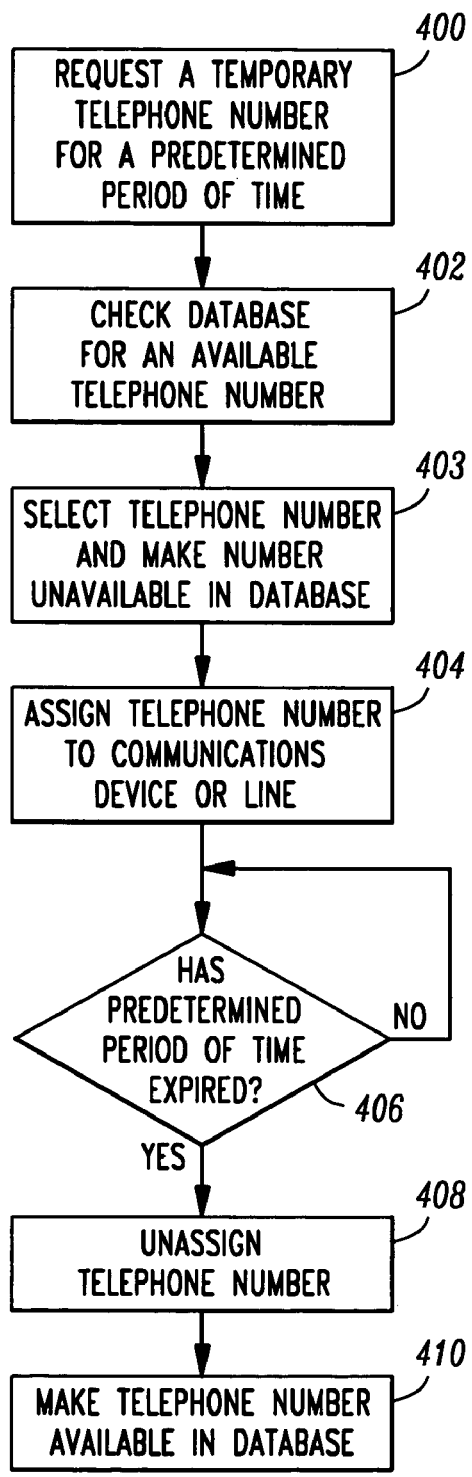

METHOD AND APPARATUS FOR ASSIGNING TELEPHONE NUMBERS

FIELD OF THE INVENTION

The present invention relates generally to telecommunication systems, and in particular, to a method and apparatus for assigning telephone numbers in a telecommunications system in a manner to conserve the number of telephone numbers required.

BACKGROUND OF THE INVENTION

Presently there is an explosion in the number of telephone numbers required to support the demands on telecommunications systems. This explosion is fueled by pagers, facsimile machines, Internet access, wireless telephones and services and businesses based on and utilizing them. For example, it is not uncommon for an individual to have a wireless phone and associated number, a fax number, at least one home telephone number and a pager with an associated number. And, the average business has a number of lines for voice communication, at least one facsimile line and several lines dedicated for computer usage.

One consequence of this rapidly expanding use of telecommunication systems is an increase in the number of telephone numbers required. In particular, in the United States, the number of area codes in many metropolitan areas is increasing multiple times annually. An increase in corresponding codes in other countries is also prevalent.

Obviously, no telecommunications service provider is advocating a reduction in use of its networks. As a matter of fact, many consumer and other groups are asserting that telecommunications service providers are partly the blame due to hoarding unused numbers, which are typically allocated in large blocks. One proposed solution to curtail the increase in the number of area codes is to reduce the size of the block of numbers allocated to a telecommunications service provider, reducing waste of unused numbers. Though this solution has merit, it ultimately does not address the underlying problem, increased usage of telephone numbers by the public.

In many cases the telephone numbers associated with a communications device, such as a wireless phone or computer access line is never or rarely used for receiving incoming calls. However, a telephone number is associated with such a device. Exploitation of this wasted number provides an opportunity for conserving telephone numbers. The present invention, as described herein exploits the never or rarely used telephone number in providing a method and apparatus for conserving telephone numbers.

SUMMARY OF THE INVENTION

In accordance with one aspect of the present invention, a method is provided for assigning telephone numbers to a communications device or line. In accordance with the method, a unique equipment identifier is assigned either to the communications device or to a communications line. However, no telephone number is associated with the communications device or line. Thus, the communications device or line can receive no incoming calls. The equipment identifier is used to facilitate outgoing telephone calls. Therefore, in spite of lacking a telephone number, the communications device or line is capable of originating telephone calls. By omitting a telephone number from assignment with a communications device or line, telephone numbers are conserved. Where a telephone number is required for purposes other than receiving an incoming phone call, an already assigned telephone number is used with the communications device or line. That is, a telephone number associated with another communications device or line is usable in place of a telephone number for the communications device or line. For example, another telephone number associated with a user is optionally associated with the communications device or line for the purposes of billing, calling line identification, and automatic number identification.

In accordance with another aspect of the present invention, a temporary telephone number is associated with a communications device or line that does not have a permanent telephone number assigned. This advantageously allows for conservation of telephone numbers, but availability of a temporary number when needed. In accordance with the method, a request is made for a temporary telephone number. This request is alternatively made via a telephone call, Internet connection, e-mail or any other suitable means. The temporary telephone number is selected from a database or pool of available temporary telephone numbers. Typically, the request for a telephone number will include a predetermined period of time for which use of the number is desired. Once a temporary telephone number is selected, the temporary telephone number is no longer available for other users. The selected temporary telephone number is associated with a communications device or line such that the communications device or line may receive incoming telephone calls placed to the temporary telephone number. After the predetermined period of time expires, the temporary telephone number is removed from association with the communication device or line such that incoming calls to the temporary telephone number do not result in an incoming call to the communications device or line. The assignment of the temporary telephone number to the communications device or line is preferably an interactive process with a user, including providing acknowledgment of the assignment and identification of the temporary number to the user.

In accordance with the invention, a communications apparatus stores a unique equipment identifier in memory. The equipment identifier permits the communications device or line to place outgoing calls. However, no telephone number is associated with the device and thus, incoming calls are not receivable by the device. An apparatus in accordance with the invention facilitates wired or wireless telecommunications. In a preferred embodiment using wired communications, the memory holding the equipment identifier is located in a telephone switch and coupled to processors for control and switching. In a preferred embodiment using wireless communications, the equipment identifier is stored in a wireless communications device and also in a database associated with the telecommunications network. The database is used to verify calling privileges of the wireless communications device.

BRIEF DESCRIPTION OF THE DRAWINGS

FIG. 3 is a flow chart illustrating a method in accordance with the present invention.

FIG. 4 is a flow chart illustrating a method for temporarily assigning a telephone number in accordance with the present invention.

DETAILED DESCRIPTION OF THE PREFERRED EMBODIMENTS

Figure 1:
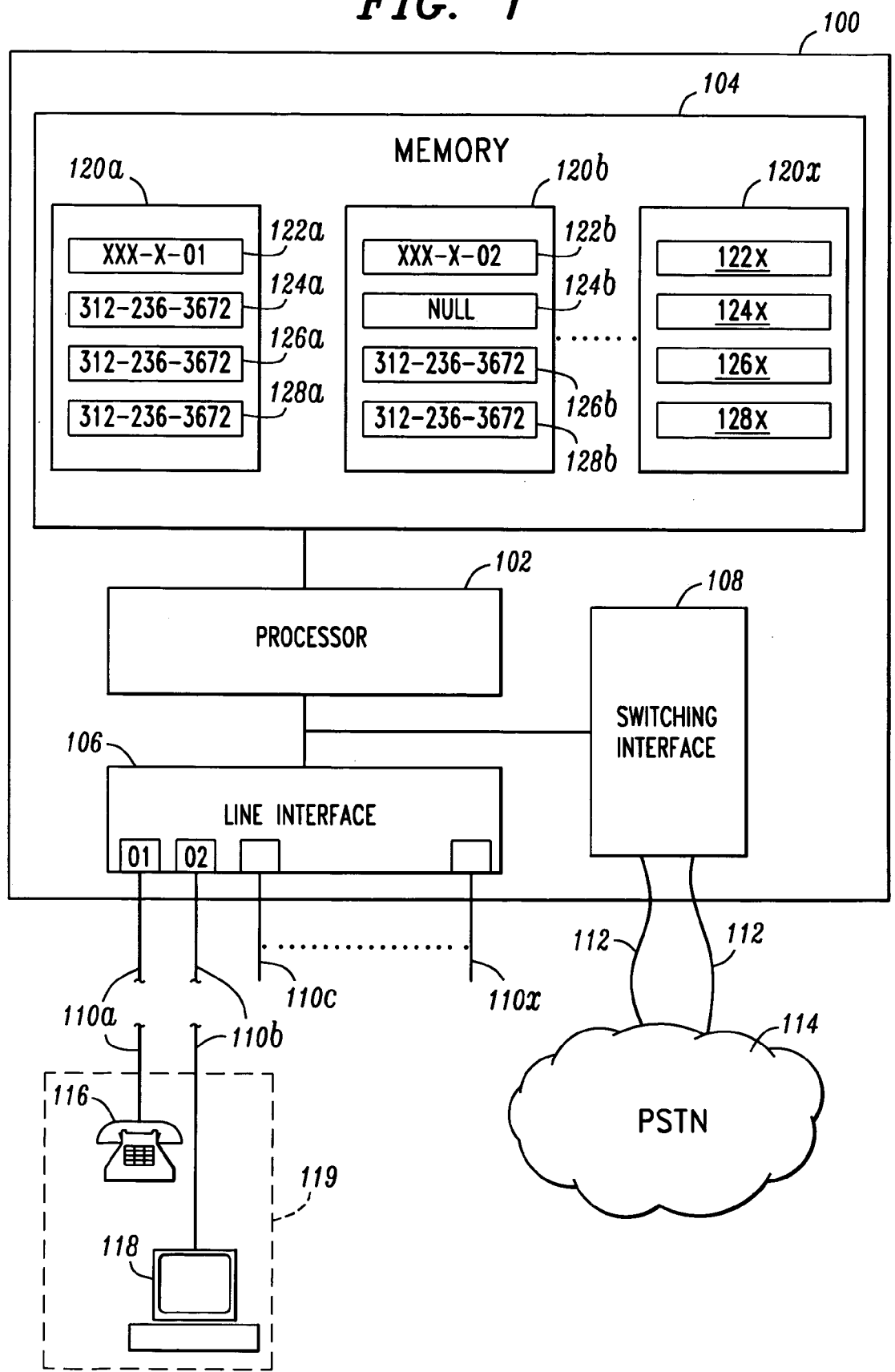
FIG. 1 is a block diagram of a telephone switching systems in accordance with the present invention.

FIG. 1 is a block diagram of a telephone switching system in accordance with the present invention. Telephone switching system 100 includes a processor 102, a memory 104, a line interface unit 106, a switching network 108, a plurality of lines 110a–110x, and a plurality of trunks or transmission interfaces 112. Switching system 100 interfaces various customer premises equipment with the public switched telephone network 114. As an example, a telephone 116 is shown coupled to line 110a and a computer 118 is shown coupled to line 110b. In a preferred embodiment switching system 100 is a 5ESS System 2000 from Lucent Technologies, Inc., Murray Hill, N.J.

Processor 102 is operably coupled to memory 104, line interface unit 106, and switching network 108 to provide control over the functions of switching system 100. Processor 102 implements a stored program, which may be stored in memory 104. Processor 102 is alternatively a single processor or multiple processors coupled together.

Line interface unit 106 interfaces communications lines 110 with system 100 and the public switched telephone network 114. Lines 110 are connected to customer premise equipment, for example, telephones, computers, facsimile machines, appliances, private branch exchanges and phone systems. A telephone 116 and a computer 118 are shown coupled to lines 110a and 110b, respectively. Computer 118 and telephone 116 are located on the same customer premises 119. Line interface unit 106 alternatively supports a variety of line and trunk interfaces including T1 and 4-wire telephone interfaces.

Switching network 108 interfaces the switching system 100 with the public switched telephone network 114. By virtue of switching network 108, customer premise equipment coupled to switching system 100 is coupled to the public switched telephone network 114. Transmission interfaces 112 couple switching system 100 to other nodes of the public switched telephone network 114.

Memory 104 includes a plurality of records 120. Records 120a, 120b and 120x are shown in FIG. 1. Records 120 relate to and are associated with the plurality of lines 110a–110x, respectively. As shown in FIG. 1, record 120a is associated with line 110a and record 120b is associated with line 110b.

Each record 120 has several fields that store information relating to the associated line. The equipment identifier is stored in field 122. The equipment identifier identifies a specific equipment termination for line 110. For example, the equipment identifier field 122a of record 120a identifies line 110a. Field 124 of records 120 stores the telephone number associated with the line 110. In accordance with the present invention, if no telephone number is associated with a line, then the telephone number field 124 holds "null" or some other identifier indicating no telephone number is associated therewith. In record 120a, telephone number field 124a contains the telephone number 312-236-3672. Accordingly, a call placed to 312-236-3672 causes line 110a to ring to indicate an incoming call. Telephone number field 124b of record 120b has a "null" in the telephone number field 124b. Accordingly, no call to any telephone number causes line 110b to ring, thereby inhibiting incoming calls to line 110b, and ultimately computer 118, which is connected to line 110b at a customer's premises.

Other fields are available in each record 120. These other fields include other information related to the associated lines. As an example, field 126 contains the billing number and field 128 contains the caller ID number. Billing number field 126 contains the telephone number used for billing calls made to and from the associated line. Billing number field 126a contains telephone number 312-236-3672, which is the same number stored in telephone number field 124b. In this case, the billing number is the same as the telephone number and charges related to line 110a are associated for purposes of billing with 312-236-3672. Billing number field 126b of record 120b also contains 312-236-3672. Therefore, calls made from line 110b are charged to 312-236-3672, which is the billing number for line 110b. In this manner, a billing number is associated with a line, even though no telephone number for receiving incoming calls is associated with the line.

Caller ID field 128 stores the telephone number used for caller ID. In record 120a the caller ID field 128a contains 312-236-3672. Therefore, the caller ID displayed on outgoing calls from line 110a is 312-236-3672, which is the same caller ID number used for line 110b. Since lines 110a and 110b are used by the same customer, references to the caller ID number and billing number, even for the line without a telephone number, are directed to the correct customer.

Although line 110b, which is associated with record 120b, does not receive incoming calls, by virtue of having no telephone number assigned, switching system 100 retains the capability to access line 110b. More specifically, the equipment identifier provides a means for accessing the associated line for maintenance, administration, testing or other functions.

Memory 104 is described above with reference to fields and records for convenience. Memory 104 is alternatively a solid state memory, hard disk, or any other memory device. Similarly, the records 120 and fields 122, 124, 126, 128 are preferably a database but may have any suitable structure for organizing and retaining the required information.

As described above, computer 118, which is associated with line 110b, does not have a telephone number assigned for incoming calls. Hence, the telephone number required for that line in the prior art is usable by another line, thereby conserving telephone numbers. The lack of a telephone number does not inhibit use of line 110b by computer 118 because the use of computer 118 is typically limited to outgoing Internet and other on-line connections. Advantageously, other numbers associated with the customer using line 110b are associated with that line for billing, caller ID and other functions.

Figure 2:
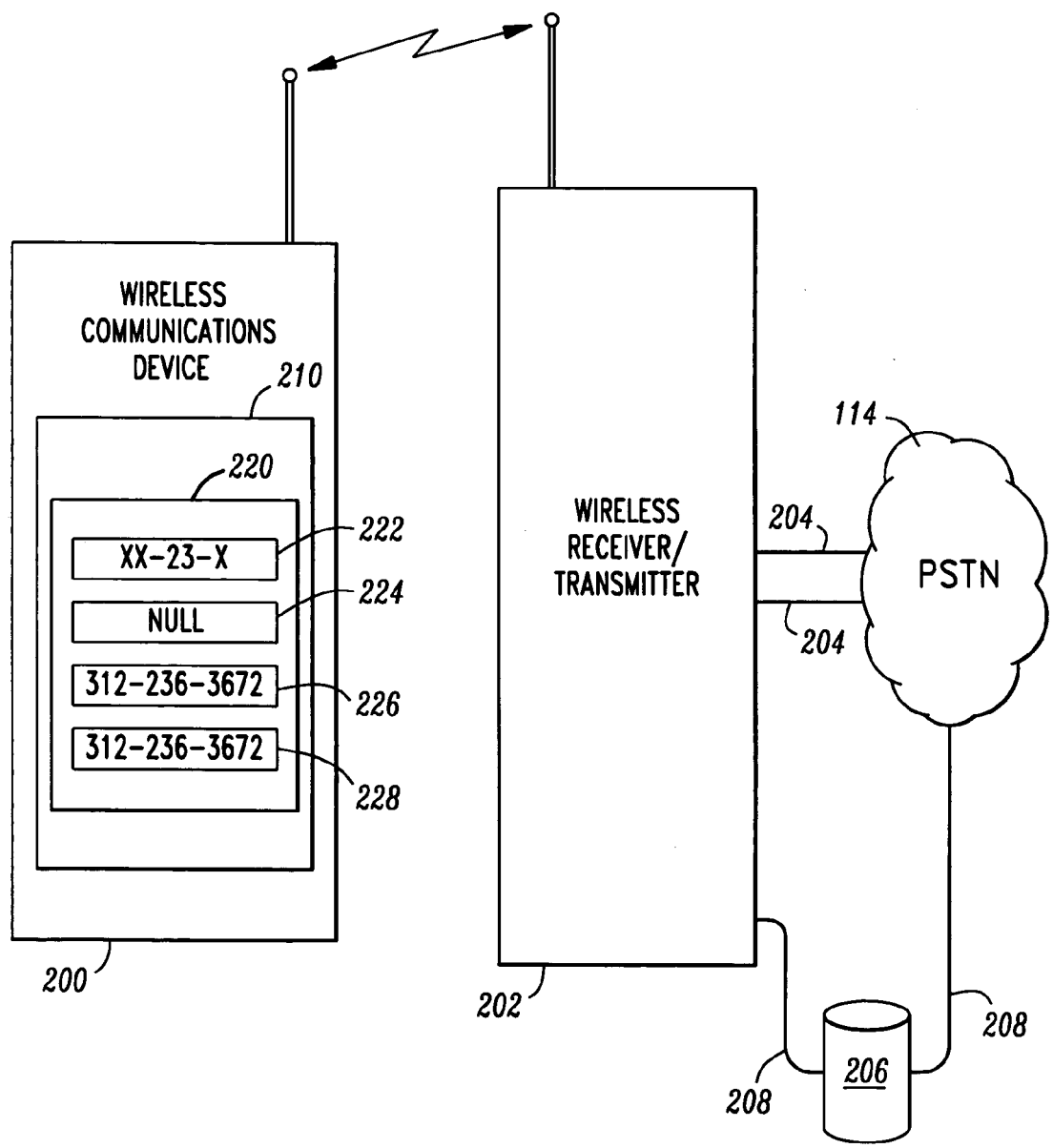
FIG. 2 is a block diagram of a preferred embodiment of a wireless communication system in accordance with the present invention.

FIG. 2 is a schematic diagram of a telecommunications system in accordance with the present invention where a wireless communications device 200 is employed. Wireless communications device 200 communicates over the air with a wireless receiver/transmitter 202, which is operably coupled to public switched telephone network 114 via a telephone network interface 204. A wireless database 206 is operably coupled to wireless receiver/transmitter 202 and public switched telephone network 114 via network 208. Database 206 is used to validate the privileges allowed to wireless communications device 200 to use the telecommunications network.

Wireless communications device 200 includes a memory 210. Memory 210 includes a record 220, which stores information associated with the wireless communication device 200. Record 220 includes an equipment identifier field 222, a telephone number field 224, a billing number field 226 and a caller ID field 228. Other fields are alternatively stored in record 224 for associating device 200 with a telecommunication network. The information stored in memory 210 may also be stored in database 206.

Equipment identifier field 222 holds an identifier for associating the wireless communication device with a telecommunications network. The equipment identifier is used to establish communications with wireless receiver/transmitter 202 and is stored in database 206 for validating the privileges device 200 has to access the telecommunications network.

Telephone number field 224 stores a telephone number for receiving incoming calls. As shown in record 220, a "null" is stored in telephone number field 224 to indicate lack of a telephone number, in accordance with the present invention. Since no telephone number is provided in telephone number field 224, wireless communications device 200 is not enabled to receive incoming calls. However, the equipment identifier allows access to the network for outgoing calls.

Billing number field 226 holds a number used to associate charges for usage of wireless communication device 200. Where a telephone number is provided, the telephone number is often the same as the billing number. Where no telephone number is provided, in accordance with the present invention, the billing number is alternatively another number associated with a subscriber or a number used by the telecommunications network for purposes of billing. Billing field 226 contains 312-236-3672, which is the telephone number for the customer associated with line 110b discussed above with respect to FIG. 1.

Caller ID field 228 holds a telephone number that is transmitted as the caller ID number in telephone calls. Where no telephone number is associated with the communications device, the caller ID number is alternatively another number associated with the subscriber using the communications device 200. Alternatively, one number shared by a number of subscribers or associated with a telecommunications provider is used for the caller ID number field. If tracing is needed for security or other measures, the equipment identifier, which is known to a telecommunications provider, may ultimately be used. Caller ID field 226 contains 312-236-3672, which is the telephone number for the customer associated with line 110b discussed above with respect to FIG. 1.

FIG. 3 is a flow chart illustrating a method of assigning telephone numbers in accordance with the present invention. The method is described with reference to the embodiments shown in FIGS. 1 and 2.

First, an equipment identifier is assigned to a communications device or line (300). This entails populating the equipment identifier field 122, 222 with an identifier that uniquely associates the communication device or line associated with the record. Then the equipment identifier is associated with a telecommunications network so that the communications device or line may place outgoing calls (302). The association of an equipment identifier with a communications device, such as device 200, allows the device to be uniquely identified by the telecommunications network. Similarly, once a line, such as line 110a is associated with an equipment identifier in the telecommunications network, for example, switching system 100, the switching system 100 may allow access for outgoing telephone calls.

At step 304, a telephone number is omitted from association with the communications device or line. In particular, a telephone number field, such as fields 124, 224 is not populated with a telephone number, but instead receives an indicator to indicate no telephone number is associated with the communications device or line. As discussed above, a communications device or communications line in accordance with the present invention advantageously lacks a telephone number but has the capability to initiate outgoing calls.

To facilitate billing, caller identification, and other purposes, a telephone number that is already assigned to another line or device for receiving incoming calls is preferably associated with the communications device or line for those purposes (306, 308). In other words, an assigned telephone number is reused for the line without a telephone number for incoming calls.

In many situations, only an outgoing calling capability is necessary. For example, only an outgoing call capability is required for browsing type Internet connections, outgoing fax capability or cellular calls. In other situations, the capability to receive incoming calls is needed sporadically or on a temporary basis. For example, a wireless telephone user, who typically uses his wireless telephone for outgoing calls, may on occasion need to receive an incoming call. To facilitate sporadic or temporary use of an incoming telephone number, a method and apparatus for temporarily assigning a telephone number is provided in accordance with the present invention.

FIG. 4 is a flow diagram illustrating a method for temporarily assigning a telephone number to a communications device or line which nominally has no telephone number assigned and hence, no ability to receive incoming calls.

First a request must be made for a temporary telephone number ("400"). A subscriber will typically make this request at the time the incoming telephone number is required. Since outgoing telecommunications is possible with the communications device, the request for a temporary telephone number is preferably made by placing an outgoing telephone call to a number that provides such a service. Alternatively, the request for a temporary telephone number may be made via e-mail, the Internet, or via a written request. Typically a telecommunications provider, such as a wireless telephone company or local telephone service provider will receive the request. Most preferably the request for a temporary telephone number is received by a computer, or a switching system, which automatically facilitates interaction with a subscriber, and the communications device or line in order to provide a temporary telephone number.

After the request for a temporary telephone number is received, a database of available telephone numbers is checked (402). Typically, a telecommunications service provider maintains a database of available temporary telephone numbers. A telephone number that is available is selected from the database (403). Of course, to prevent multiple assignments of temporary telephone numbers, the selected temporary telephone number is removed from the database or otherwise marked as unavailable for future use (403).

Once a temporary telephone number is selected, the telephone number is assigned to the communications device or line (404). This typically, entails populating a record associated with the communications device or telephone line with the temporary telephone number. More specifically, the temporary telephone number is placed in the telephone number field 124, 224 of a record 120, 220 associated with the communications device or line. The temporary telephone number is also provided to the subscriber. Any billing associated with use of the temporary number is initiated at this point.

The request for a temporary telephone number typically has a time period of temporary use specified. The time period of temporary use will indicate the number of days, hours or minutes that the number is desired for temporary use. This predetermined period of time of use is monitored to determine the time at which the temporary number is no longer needed (406). Once the specified period of use has expired, the temporary telephone number is removed from association with the communications device or line (408). This entails replacing the telephone number field in a record associated with the communications device or line with an indication that no telephone number is associated therewith. Of course, other databases may need to be updated, including databases such as subscriber database 206.

Once a temporary number has been removed from temporary use, the number may be made available for reuse in the database (410). Also, final charges may be assessed for use of the temporary number. Preferably, reuse of temporary numbers is regulated in a manner to increase the time intervals of use between numbers, thereby reducing errors in use of temporary numbers.

The present invention reduces the number of telephone numbers required in a telecommunications network by omitting assignment of a telephone number to communication devices and lines that do not need, or only temporarily need to receive incoming calls. For purposes other than receiving a call, telephone numbers assigned to other devices or lines are reused on devices or lines without a telephone number for receiving incoming calls. By virtue of the present invention, telephone numbers are conserved. By removing the necessity of a telephone number for incoming calls, optional provision of a telephone number for incoming calls may be provided at a premium cost, allocating the cost of additional telephone numbers to users requiring them.

The invention being thus described, it will be evident that the same may be varied in many ways. Such variations are not to be regarded as a departure from the spirit and scope of the invention and all such modifications are intended to be included within the scope of the appended claims.

The invention claimed is:

1. A method for assigning a telephone number to a communications device or line comprising the steps of:
   A) assigning a unique equipment identifier to the communications device or line;
   B) associating the unique equipment identifier with a telecommunications network such that an outgoing call may be originated from the communications device or line that has the unique equipment identifier; and
   C) omitting association of a telephone number with the unique equipment identifier, thereby inhibiting incoming calls to the communications device or line by lack of a telephone number being associated therewith.

2. The method of claim 1 further comprising the step of:
   D) associating a currently assigned telephone number with the communications device or line for billing.

3. The method of claim 1 further comprising the step of:
   D) associating a currently assigned telephone number with the communications device or line for maintenance on the communications device or line.

4. The method of claim 1 further comprising the step of:
   D) associating a currently assigned telephone number with the communications line or device for automatic number identification.

5. The method of claim 1 further comprising the step of:
   D) associating a currently assigned telephone number with the communications line or device for purposes other than receiving an incoming telephone call.

6. The method of claim 1 further comprising the step of:
   D) associating a currently assigned telephone number with the communications line or device for calling number identification.

7. The method of claim 1 further comprising the step of:
   D) temporarily assigning an unassigned telephone number to the communications device or line in response to a request for a temporary telephone number.

8. The method of claim 7 wherein the request for a temporary telephone number is initiated by a telephone call.

9. The method of claim 1 wherein the communications device is a wireless telephone.

10. The method of claim 7 wherein the unassigned telephone number is assigned for a predetermined period of time.

11. A communications device comprising:
    a memory storing a unique equipment identifier, the equipment identifier uniquely identifying a communications device or line, wherein no incoming call is receivable and outgoing calls are operably placed using the communications device or line based on the equipment identifier, and wherein no telephone number is associated the communications device or line for the purpose of receiving incoming calls.

12. A telecommunications switch comprising:
    a plurality of lines for outgoing and incoming telephone calls;
    a memory associated with each line of the plurality of lines;
    the memory storing an equipment identifier used to communicate with each line; and
    wherein at least one of the plurality of lines has no assigned telephone number for receiving incoming calls and has a capability to originate outgoing calls.

13. A method for assigning a telephone number to a communications line comprising the steps of:
    A) assigning a unique equipment identifier to the communications line;
    B) associating the unique equipment identifier with a telecommunications network such that an outgoing call may be originated from the communications line that has the unique equipment identifier; and
    C) omitting association of a telephone number with the unique equipment identifier to inhibit incoming calls to the communications line by lack of a telephone number being associated therewith.

14. The method of claim 13 further comprising the step of:
    D) associating a currently assigned telephone number with the communications line for billing.

15. The method of claim 14 further comprising the step of:
    E) associating a currently assigned telephone number with the communications line for maintenance on the communications line.

16. The method of claim 15 further comprising the step of:
    F) associating a currently assigned telephone number with the communications line for automatic number identification.

17. The method of claim 16 further comprising the step of:
    G) associating a currently assigned telephone number with the communications line for purposes other than receiving an incoming telephone call.

18. The method of claim 17 further comprising the step of:
    H) associating a currently assigned telephone number with the communications line for calling number identification.

19. The method of claim 13 further comprising the step of:
    D) temporarily assigning an unassigned telephone number to the communications line in response to a request for a temporary telephone number.

20. The method of claim 19 wherein the request for a temporary telephone number is initiated by a telephone call.

* * * * *